No. 858,306. PATENTED JUNE 25, 1907.
L. H. PLEINS.
TRAP.
APPLICATION FILED JUNE 24, 1905.
2 SHEETS—SHEET 2.
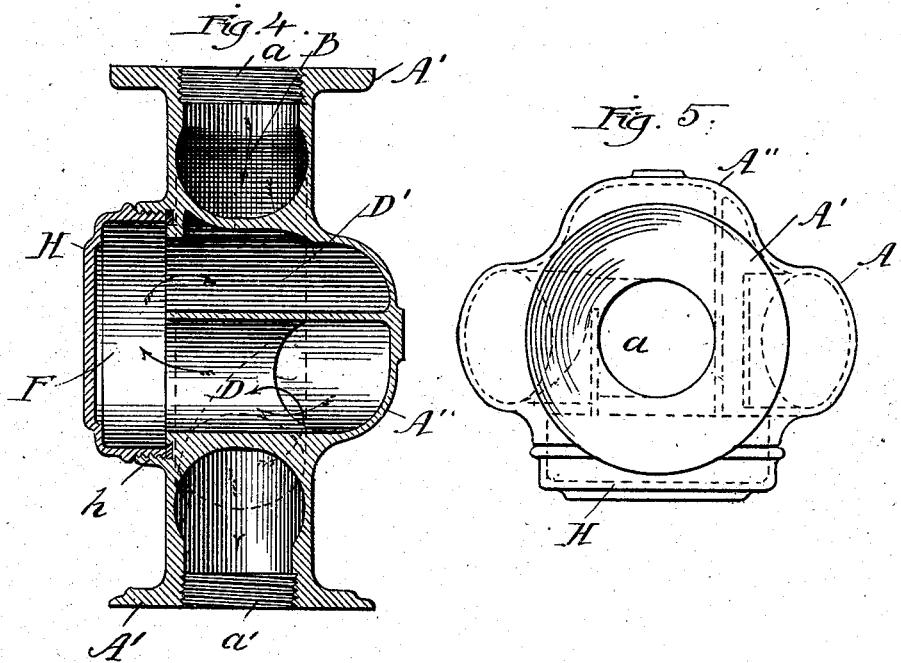
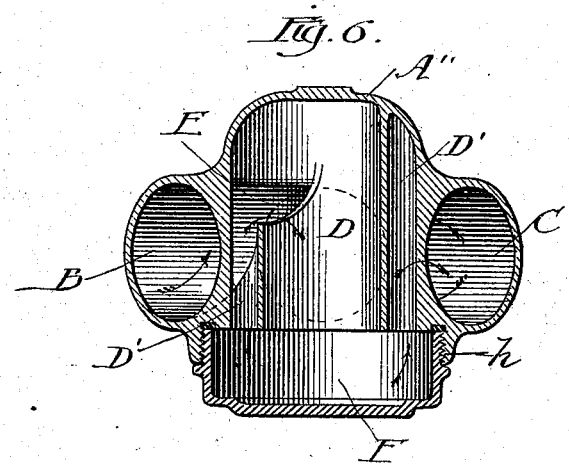
Witnesses:
Frank J. Blanchard
Jessie E. Litzey
Inventor:
Leo H. Pleins
By ... 
Attorney.

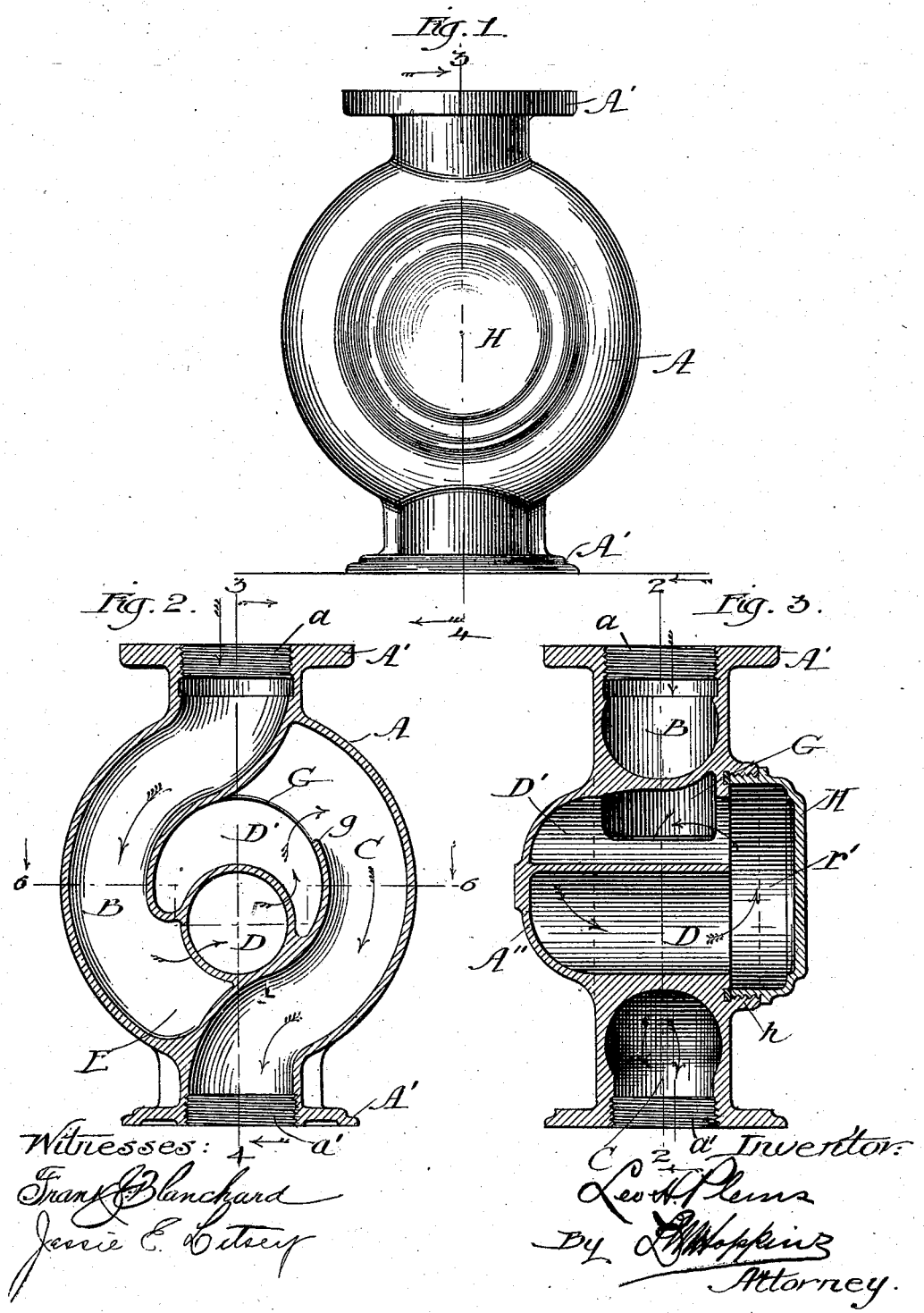

UNITED STATES PATENT OFFICE.

LEO H. PLEINS, OF CHICAGO, ILLINOIS, ASSIGNOR TO JAMES B. CLOW & SONS, OF CHICAGO, ILLINOIS, A CORPORATION.

TRAP.

No. 858,306.    Specification of Letters Patent.    Patented June 25, 1907.

Application filed June 24, 1905. Serial No. 266,889.

*To all whom it may concern:*

Be it known that I, LEO H. PLEINS, a citizen of the United States, residing at Chicago, in the county of Cook and State of Illinois, have invented certain new and useful Improvements in Traps, of which the following is a specification.

The present invention relates to that class of traps used in sanitary plumbing in which siphoning or the breaking of the water seal of the trap is prevented. It is admitted that this has heretofore been accomplished and it is to be understood, therefore, that the present invention resides and consists in the features of novelty that are hereinafter described.

In the accompanying drawing which is made a part of this specification, Figure 1 is a front elevation of a trap embodying the invention. Fig. 2 is a vertical section thereof on the line 2—2 Fig. 3 looking in the direction of the arrows. Fig. 3 is a vertical section thereof on the line 3—4 Figs. 1 and 2 looking in the direction of the arrow 3. Fig. 4 is a vertical section on the same line looking in the direction of the arrow 4. Fig. 5 is a plan view. Fig. 6 is a horizontal section on the line 6—6, Fig. 2 looking downward.

I am aware that shape, appearance, symmetry, etc., apart from function, can not lend patentability to a mechanical organism or combination having a mechanical function for its object but at the same time ornateness and beauty are desirable in most objects and particularly so in objects of the class to which the present invention belongs and one of my aims was to produce an efficient device of the class described that possesses these qualities or characteristics.

The object of the invention may be said to be the provision of an improved trap for use in connection with various sanitary appliances that is ornate and sightly in its appearance and which is so constructed that siphoning or the breaking of the water seal can not take place either in the ordinary use of the trap or by the suction produced by the evacuation of a neighboring fixture.

The improved trap has a shell, A, the main body of which is circular in a vertical plane cutting it centrally and which has at top and bottom openings, $a$ and $a'$, for the admission and discharge, respectively, of the water or other liquid. At these openings the shell may be provided with screw threads for attaching it to the inlet and outlet pipes, or it may be provided with flanges, A', for the same purpose, the one or the other being used, depending upon the size and capacity of the trap. In the drawing I have shown the shell as being provided with both of these means so that either may be used as occasion may require.

The novelty of the improved trap resides in the disposition of the several branches of the water-way through which the water passes from the inlet opening $a$ to the outlet opening $a'$. This water-way comprises an inlet branch B, and an outlet branch C, which branches follow the contour of the circular walls of the shell and are disposed with their vertical axes in a common vertical plane, two parallel branches D and D' located one above the other, the axes of said branches being horizontal, or substantially so, and perpendicular to the common plane of the axes of the branches B and C, a branch E extending upward, obliquely, through which the lower end of the inlet branch B communicates with one end of the lower horizontal branch D, and a branch F through which the other end of the lower horizontal branch communicates with the corresponding end of the upper horizontal branch D', the latter being in communication with the upper end of the outlet branch C through a lateral port G, the overflow lip $g$ of which is located above the horizontal plane of the top of the lower horizontal branch D. The lip $g$ determines the level of the water standing in the branch D' when the trap is not in action, and being located as described, it maintains in the branch D' a body of water which seals the branch D.

In its passage through the trap the water enters at $a$, passes downwardly through the inlet branch B, thence through the oblique branch E into one end of the lower horizontal branch D, thence through said branch D into the branch F, thence through said branch F into one end of the upper horizontal branch D', thence through the port G into the upper end of the outlet branch C, and thence downwardly through the outlet branch escaping through the outlet opening $a'$. The entire trap is preferably made in two parts, one of which parts, H, takes the form of a cap having threaded engagement with a flange $h$ on the other part. Said cap is preferably located at the front vertical side of the trap so that free access may be had to it for removing it and giving access to the two horizontal branches, D and D'. The cap contains the branch F of the water-way, while all of the other branches are formed in the other part of the shell. The cap is located at one side of the vertical plane of the branches B and C, and in order to preserve the symmetry of the trap but more particularly to make provision for extending the horizontal branches D and D' beyond the vertical plane of the branches B and C on the side of the trap opposite the cap, the shell is provided with a bulbous enlargement $a''$ which lies at the other side of the vertical plane of the branches B and C. By extending the branches D' and F vertically above the overflow lip $g$ and by extending the branch D' horizontally beyond the plane of the branches B and C chambers are provided. When the trap is in operation, all of its passages, including these chambers, will become filled with water and where the siphonic action in the outlet branch C of the trap becomes broken, the water which had accumulated in said chambers will recede and will not only reëstablish the seal at the lower end of the branch B but also seal the end of the horizontal branch D, it being understood, of course, that the chambers are of ample capacity for this purpose. I desire to have it understood, however, that the invention is not limited to the number of pieces of which the trap is made, nor to the identical arrangement above described and shown in the drawing of the several branches of the water-way. Broadly stated, I believe that I am the first to construct a trap with an inlet branch and an outlet branch, the former extending below and the latter extending above a given horizontal plane, a horizontal branch with one end of which the inlet branch communicates, a second horizontal branch, located above the first horizontal branch, with the upper side of which the outlet branch communicates, and a branch connecting the adjacent ends of the two horizontal branches. The identical construction and arrangement above described and shown in the drawing has certain advantages and said construction is specifically claimed.

I am aware of the so called sanitas trap, in which the body of the trap is disposed horizontally with an inlet at the bottom, an outlet at the top, and a diagonally arranged diaphragm for dividing the body into two lateral branches which communicate with each other at one side of the trap only through a cap or cover similar to the cap, H, above described.

In the foregoing descripton I have made use of the terms, "vertical", "horizontal", "perpendicular", etc., but I desire to have it understood that the invention is not limited to mathematical accuracy in these respects. On the contrary it includes and comprehends such approximations as will give the results aimed at.

What I claim as new and desire to secure by Letters Patent is:

1. A trap, having two horizontal branches located one above the other, an inlet branch extending below the top of the lower horizontal branch, a branch extending upward from the lower end of the inlet branch and communicating with the lower horizontal branch, a branch connecting adjacent ends of the two horizontal branches, and an outlet branch communicating with the upper horizontal branch and at a point above the top of the lower horizontal branch.

2. A trap, having two horizontal branches located one above the other, an inlet branch extending below the top of the lower horizontal branch, a branch extending upward obliquely from the lower end of the inlet branch and communicating with one end of the lower horizontal branch, a branch connecting the other end of the lower horizontal branch with the corresponding end of the upper horizontal branch and an outlet branch communicating with the upper horizontal branch at a point above the top of the lower horizontal branch.

3. A trap, having two horizontal branches located one above the other, an inlet branch, the lower end of which communicates with the lower horizontal branch, a branch connecting the two horizontal branches, and an outlet branch communicating laterally with the upper side of the upper horizontal branch at a point above the top of the lower horizontal branch, the upper horizontal branch being extended, horizontally, beyond the vertical plane of the inlet and outlet branches.

4. A trap, having two horizontal branches located one above the other, an inlet branch extending below the top of the lower horizontal branch, a branch connecting the lower end of the branch with the lower horizontal branch, a branch connecting the ends of the two horizontal branches, and an outlet branch communicating with the upper horizontal branch at a point above the top of the lower horizontal branch, the branch connecting the two horizontal branches being located at one side of the vertical plane of the inlet and outlet branches and extended vertically above the overflow lip of the upper horizontal branch, and said upper horizontal branch also being extended above said lip and extended also beyond the vertical plane of the inlet and outlet branches.

5. A trap having inlet and outlet branches; two horizontal branches located between the inlet and outlet branches, a branch extending upward from the lower end of the inlet branch and communicating with one end of the lower horizontal branch, and a branch connecting the other ends on the horizontal branches, the inlet and outlet branches being arranged with their vertical axes in a plane which is perpendicular to the axes of the horizontal branches and which is intermediate of the ends of the horizontal branches, and the outlet branch communicating laterally with the upper horizontal branch at a point above the top of the lower horizontal branch.

6. A trap, having a circular shell, said shell containing inlet and outlet branches following the circular contour of the walls of the shell and having their axes located in a common vertical plane, two horizontal branches located between the inlet and outlet branches and having their axes perpendicular to the vertical plane aforesaid, a branch connecting the lower end of the inlet branch with one end of the lower horizontal branch, a branch connecting the other end of the lower horizontal branch with the corresponding end of the upper horizontal branch, the latter being in communication with the outlet branch at a level above the level of the top of the upper horizontal branch.

7. A trap, having a circular shell, said shell containing inlet and outlet branches following the circular contour of the opposite walls of the shell and having their axes located in a common vertical plane, two horizontal branches located one above the other and between the inlet and outlet branches, a branch extending upward from the lower end of the inlet branch and communicating with the lower horizontal branch, a branch connecting the adjacent ends of the two horizontal branches, the upper portion of the upper horizontal branch being in communication with the outlet branch through a lateral port located above the level of the top of the lower horizontal branch.

8. A trap, having a circular shell, said shell containing two centrally located horizontal branches, located one above the other, an inlet branch following the circular contour of the shell and communicating with the lower horizontal branch, a branch connecting the adjacent ends of the two horizontal branches and an outlet branch following the circular contour of the shell and communicating with the upper horizontal branch at a point above the level of the top of the lower horizontal branch.

LEO H. PLEINS.

Witnesses:
N. E. LEVY,
L. CHRISTIN.